(12) United States Patent
Tsai

(10) Patent No.: US 9,583,150 B2
(45) Date of Patent: Feb. 28, 2017

(54) PROTECTIVE COVER AND ASSEMBLY OF A STORAGE DEVICE AND A PROTECTIVE COVER

(71) Applicants: LITE-ON ELECTRONICS (GUANGZHOU) LIMITED, Guangzhou (CN); LITE-ON TECHNOLOGY CORP., Taipei (TW)

(72) Inventor: Chun-Chi Tsai, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 22 days.

(21) Appl. No.: 14/174,023

(22) Filed: Feb. 6, 2014

(65) Prior Publication Data

US 2014/0224682 A1    Aug. 14, 2014

(30) Foreign Application Priority Data

Feb. 8, 2013    (CN) .......................... 2013 1 0051032

(51) Int. Cl.
*B65D 85/00* (2006.01)
*G11B 33/02* (2006.01)

(52) U.S. Cl.
CPC ....... *G11B 33/022* (2013.01); *Y10T 29/49826* (2015.01)

(58) Field of Classification Search
CPC . G11B 33/022; G11B 23/02; Y10T 29/49826; H02G 3/08; H02G 3/081; H02G 3/086; H05K 5/0004; H05K 5/0052; H05K 5/0013; H05K 5/0008; B65D 2519/00019; B65D 2519/00054; B65D 2519/0012
USPC .......................................... 206/307; 312/305
See application file for complete search history.

*Primary Examiner* — Anthony Stashick
*Assistant Examiner* — James M Van Buskirk
(74) *Attorney, Agent, or Firm* — Rosenberg, Klein & Lee

(57) ABSTRACT

A protective cover includes a base plate, and a cover unit cooperating with the base plate to define an accommodating space and including an opening communicating with the accommodating space for entry of a first or second storage device into the accommodating space. At least one pad member is connected foldably to the base plate and is operable to move between unfolded and folded positions. The pad member is folded over the base plate when in the folded position. The accommodating space is adapted to accommodate the first storage device when the pad member is in the unfolded position and the second storage device when the pad member is in the folded position.

20 Claims, 10 Drawing Sheets

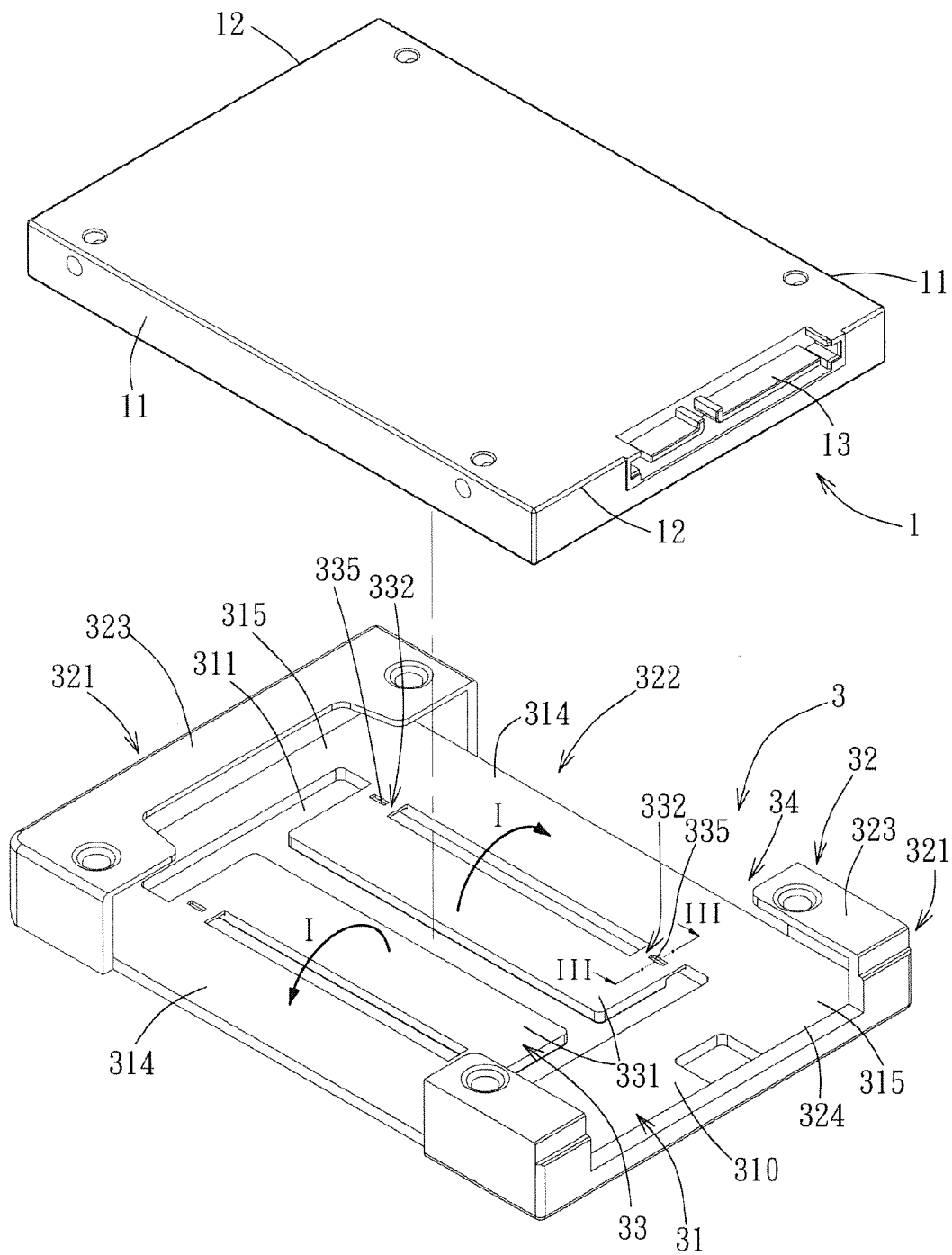
F I G. 1

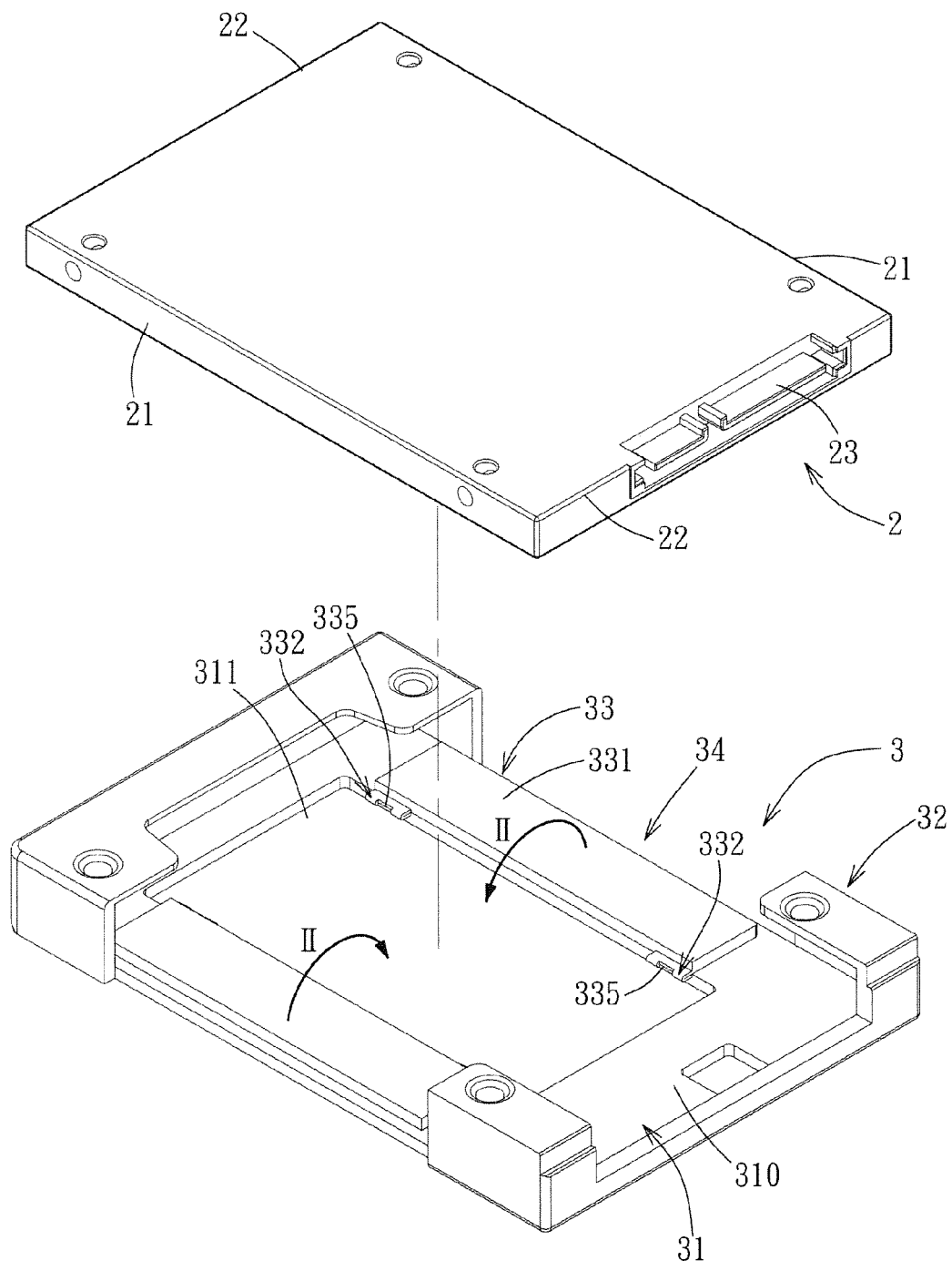
F I G. 2

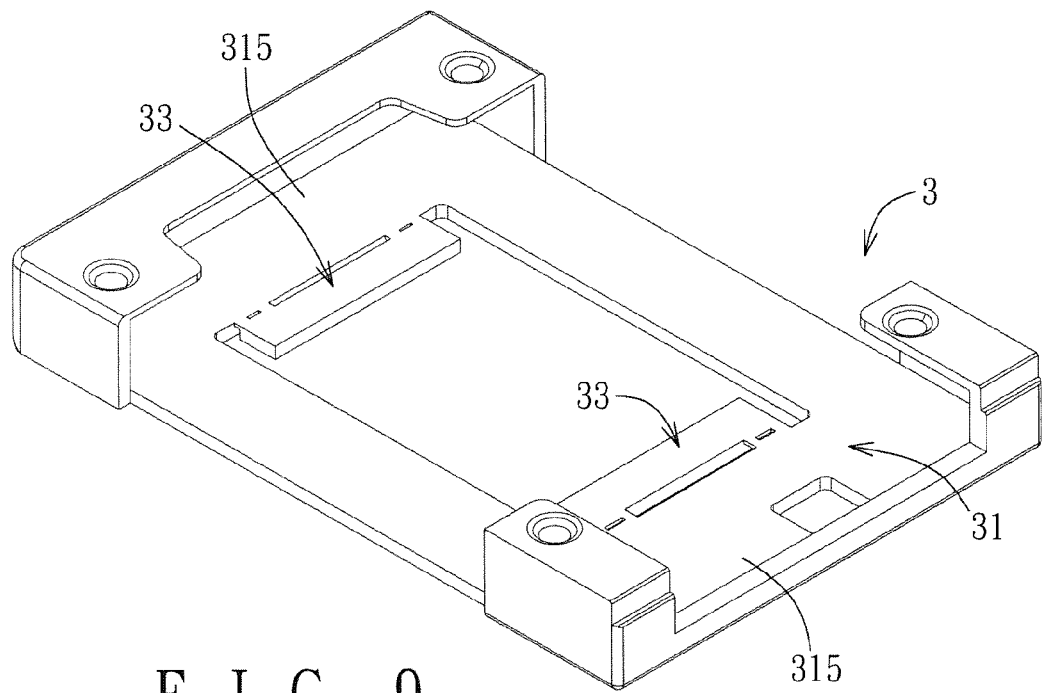
F I G. 9
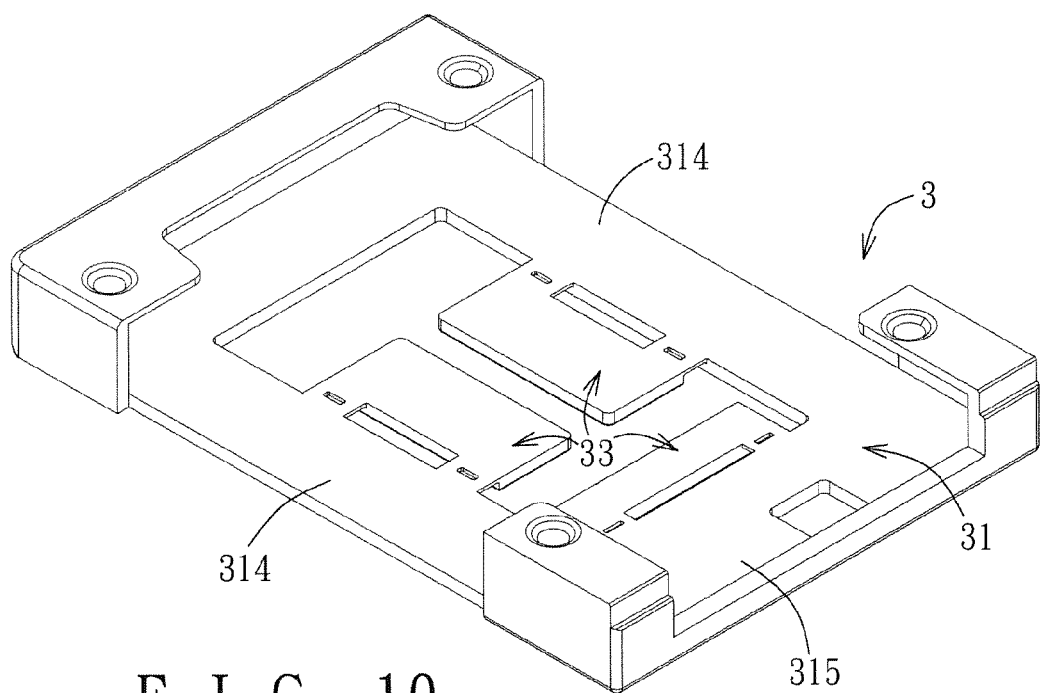
F I G. 10

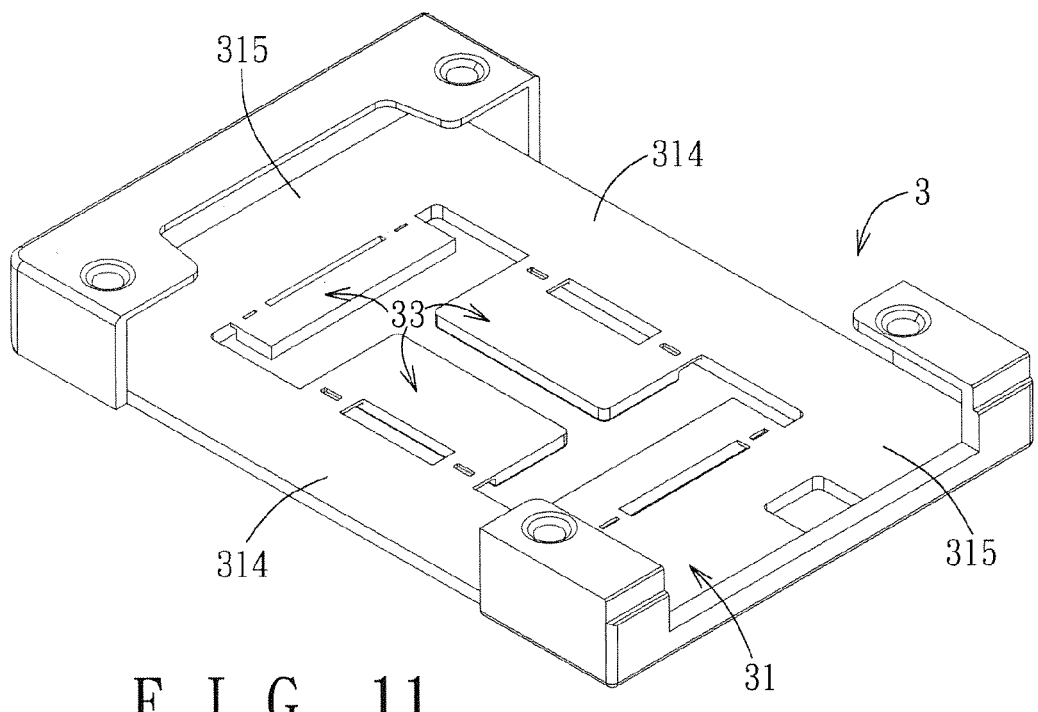
F I G. 11
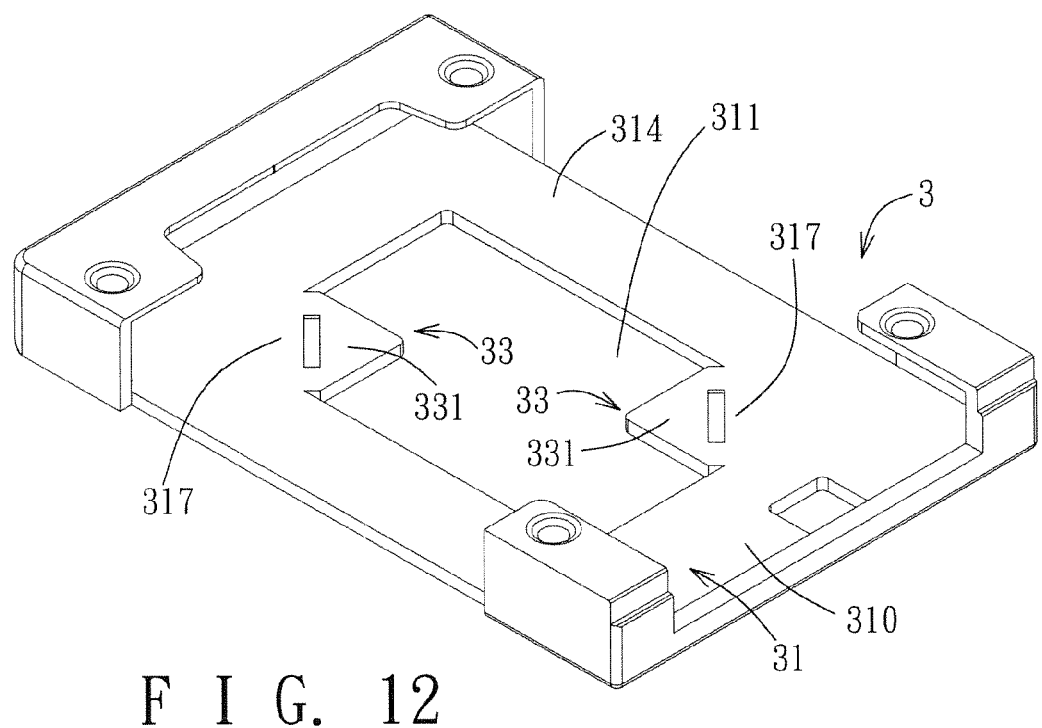
F I G. 12

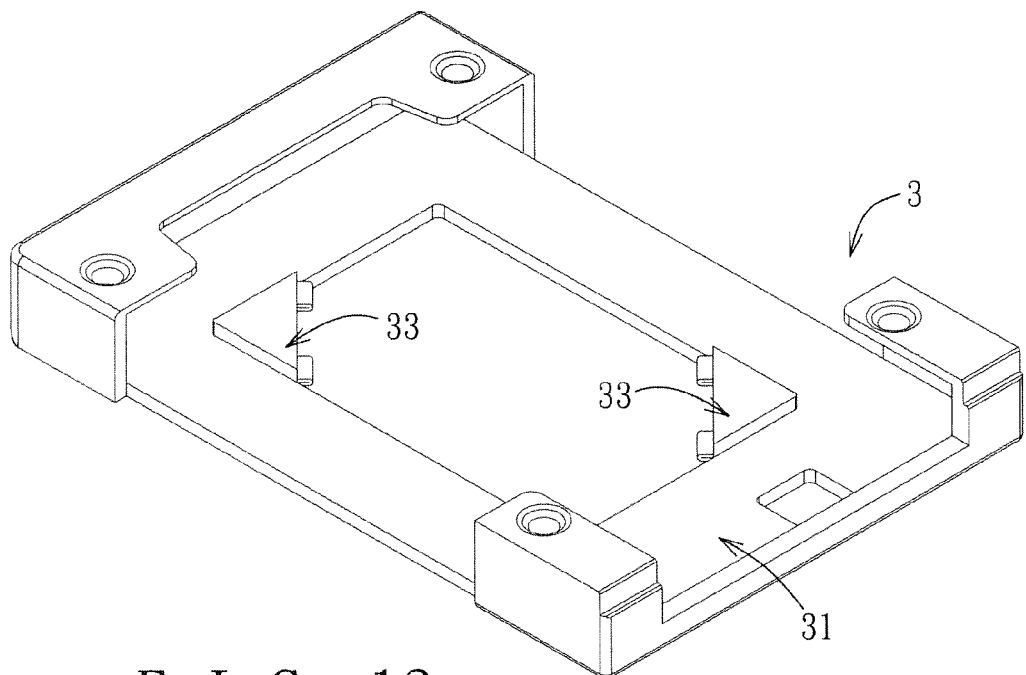
F I G. 13
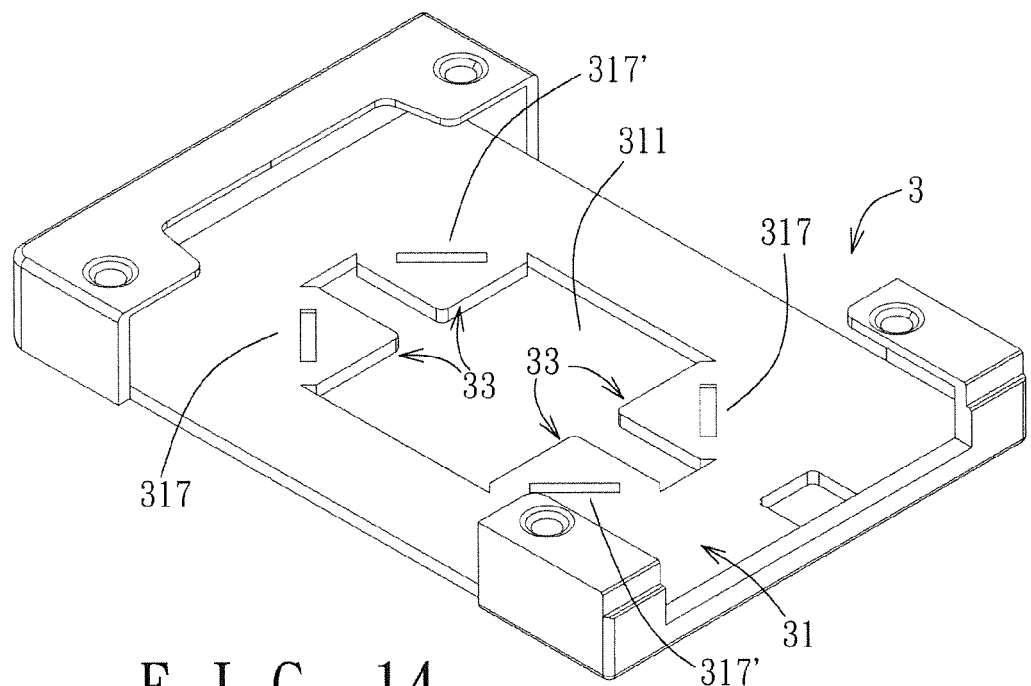
F I G. 14

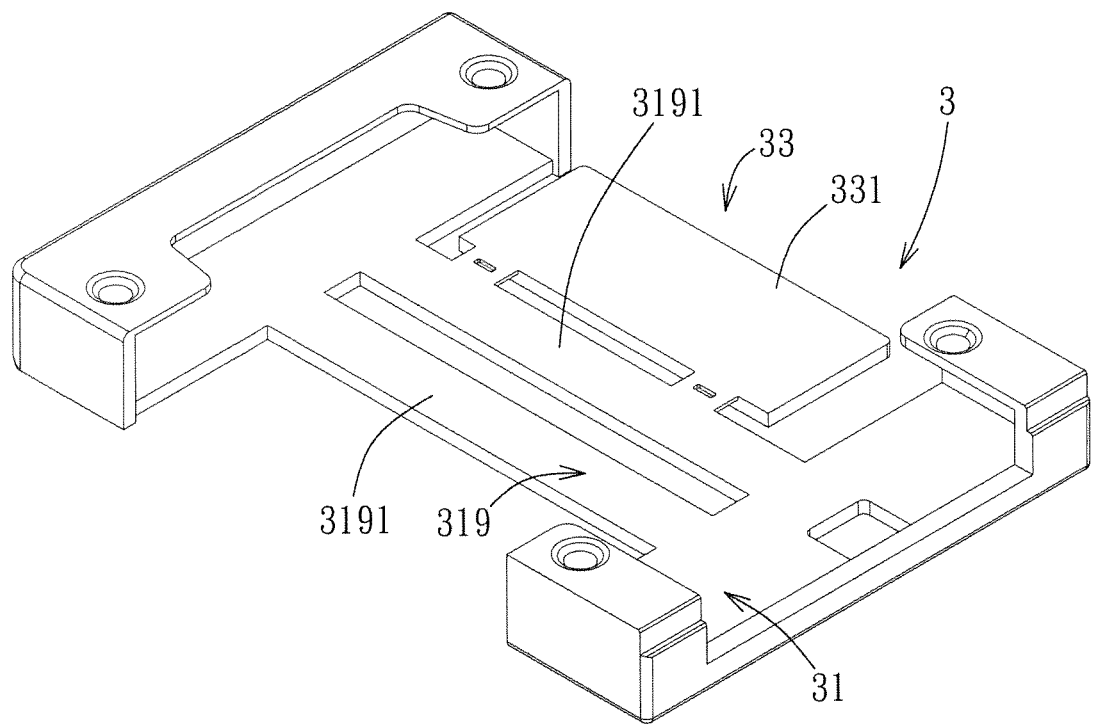
F I G. 17

PROTECTIVE COVER AND ASSEMBLY OF A STORAGE DEVICE AND A PROTECTIVE COVER

CROSS REFERENCE TO RELATED APPLICATION

This application claims priority of Chinese Patent Application No. 201310051032.X, filed on Feb. 8, 2013.

BACKGROUND OF THE INVENTION

1. Field of the Invention

The invention relates to a protective cover and an assembly of an electronic device and a protective cover, more particularly to a protective cover that can reduce vibration in an electronic product and that has an adjustable accommodating space and an assembly of a storage device and a protective cover.

2. Description of the Related Art

The present technology tends to accelerate the speed and expand the memory capacity of the hard disk drives. When a hard disk drive is reading data and is hit by an external force, the data may be damaged. Thus, how to protect the hard disk drive against shock has become one of the factors to be considered in protecting the hard disk drive.

Generally, a bottom housing of a notebook computer is provided with an accommodating space for accommodating a hard disk drive. Currently existing protective cover of a hard disk drive is designed to have a size according to that of an outer casing of the hard disk drive so as to cover the same. To assemble the hard disk drive to the bottom housing, the hard disk drive is first mounted in the protective cover, after which an outer side of the protective cover is covered with a sheet metal plate. Finally, the assembly of the hard disk drive and the protective cover is fixed to the bottom housing. At present, the hard disk drive of a notebook computer has two standard thicknesses: 7 mm and 9 mm. Thus, two different molds are necessary to make the protective covers for the two standard thicknesses of the hard disk drive. The protective covers are provided with respective material numbers. Since use of the protective covers for the two standard thicknesses of the hard disk drive cannot be interchanged, when a protective cover is to be assembled to the hard disk drive, a worker must take note of the material number of the protective cover that corresponds to the size of the hard disk drive. This results in spending a lot of time.

SUMMARY OF THE INVENTION

Therefore, an object of the present invention is to provide a protective cover that can accommodate different thicknesses of an electronic device and that can save hours of work required for assembly. The electronic device specifically refers to a storage device.

According to one aspect of this invention, a protective cover comprises a base plate, a cover unit and at least one pad member. The cover unit is connected to and cooperates with the base plate to define an accommodating space for accommodating a first storage device or a second storage device which has a thickness smaller than that of the first storage device. The cover unit includes an opening communicating with the accommodating space for entry of the first or second storage device into the accommodating space, and at least one fit over portion disposed on the base plate and adapted to fit over the first or second storage device. The fit over portion has a retaining wall spaced apart from the first surface. The pad member is connected foldably to the base plate and is operable to move between an unfolded position and a folded position. The pad member is folded over the base plate within the accommodating space when in the folded position. The retaining wall and the base plate has a first distance when the pad member is in the unfolded position. The retaining wall and the pad member has a second distance when the pad member is in the folded position. The second distance is smaller than the first distance. The accommodating space is adapted to accommodate the first storage device when the pad body is disposed in the unfolded position, and is adapted to accommodate the second storage device when the pad body is disposed in the folded position.

Another object of the present invention is to provide an assembly of a storage device and a protective cover. The protective cover can accommodate different thicknesses of an electronic device and can save hours of work required for assembly.

According to another aspect of this invention, an assembly of a storage device and a protective cover comprises a first storage device or a second storage device which has a thickness smaller than that of the first storage device, and a protective cover. The protective cover includes a base plate, a cover unit and at least one pad member. The cover unit is connected to and cooperates with the base plate to define an accommodating space for accommodating the first or second storage device. The cover unit includes an opening communicating with the accommodating space for entry of the first or second storage device into the accommodating space, and at least one fit over portion disposed on the base plate and configured to fit over the first or second storage device. The fit over portion has a retaining wall spaced apart from the first surface. The pad member is connected foldably to the base plate and is operable to move between an unfolded position and a folded position. The pad member is folded over the base plate within the accommodating space when in the folded position. The retaining wall and the base plate has a first distance when the pad member is in the unfolded position. The retaining wall and the pad member has a second distance when the pad member is in the folded position. The second distance is smaller than the first distance. The accommodating space is configured to accommodate the first storage device when the pad body is disposed in the unfolded position, and is configured to accommodate the second storage device when the pad body is disposed in the folded position.

BRIEF DESCRIPTION OF THE DRAWINGS

Other features and advantages of the present invention will become apparent in the following detailed description of the preferred embodiments with reference to the accompanying drawings, of which:

FIG. 1 is an exploded perspective view of a first storage device and a protective cover according to the first preferred embodiment of the present invention;

FIG. 2 is an exploded perspective view of a second storage device and the protective cover of the first preferred embodiment;

FIG. 9 is a perspective view of a protective cover according to the second preferred embodiment of the present invention;

FIG. 10 is a perspective view of a protective cover according to the third preferred embodiment of the present invention;

FIG. 11 is a perspective view of a protective cover according to the fourth preferred embodiment of the present invention;

FIG. 12 is a perspective view of a protective cover according to the fifth preferred embodiment of the present invention;

FIG. 13 is a view similar to FIG. 12, but illustrating two pad members in a folded position;

FIG. 14 is a perspective view of a protective cover according to the sixth preferred embodiment of the present invention;

FIG. 17 is a perspective view of a protective cover according to the eighth preferred embodiment of the present invention.

DETAILED DESCRIPTION OF THE PREFERRED EMBODIMENTS

Figure 3:
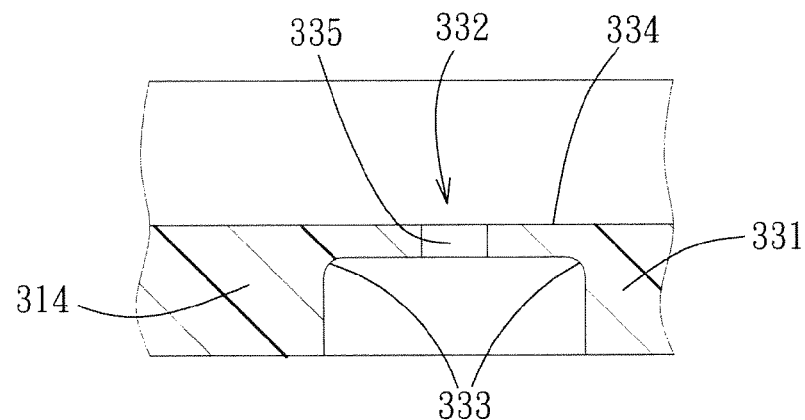
FIG. 3 is a fragmentary sectional view of the first preferred embodiment taken along line of FIG. 1.

The above-mentioned and other technical contents, features, and effects of this invention will be clearly presented from the following detailed description of the preferred embodiments in coordination with the reference drawings.

Before this invention is described in detail, it should be noted that, in the following description, similar elements are designated by the same reference numerals.

Referring to FIGS. 1 and 2, a protective cover 3 according to the first preferred embodiment of the present invention is configured to accommodate an electronic device. The electronic device may be a first storage device 1 (see FIG. 1) or a second storage device 2 (see FIG. 2). Each of the first and second storage devices 1, 2 may be, for example, a hard disk drive of a notebook computer, a hard disk drive of an All-in-One computer, or an external hard drive. In this embodiment, each of the first and second storage devices 1, 2 is exemplified as a hard disk drive of a notebook computer.

The first storage device 1 has a generally rectangular shape when viewed from above, and includes two opposite long sides 11, two short sides 12 respectively connected between the two opposite long sides 11, and a connecting port 13 provided in one of the short sides 12. The second storage device 2 also has a generally rectangular shape when viewed from above, and includes two opposite long sides 21, two short sides 22 respectively connected between the two opposite long sides 21, and a connecting port 23 provided in one of the short sides 22. The appearance difference between the first and second storage devices 1, 2 resides in the thickness thereof. In this embodiment, the first storage device 1 is a 2.5-inch type hard disk drive having a thickness of 9 mm, while the second storage device 2 is a solid state drive (SSD) having a thickness of 7 mm. The connecting port 13, 23 of each of the first and second storage devices 1, 2, is, for example, a standard SATA interface connecting port.

In this embodiment, the protective cover 3 is made of a soft shock-absorbing material, and includes a base plate 31, a cover unit 32 and two pad members 33. In this embodiment, the soft shock-absorbing material for making the protective cover 3 may be silicone, rubber, thermoplastic polyurethane (TPU), or other similar materials. By virtue of the characteristics of the soft shock-absorbing material, the protective cover 3 can absorb vibration energy generated by the first or second storage device 1, 2, can effectively reduce vibration due to accidental dropping or the presence of an external force, and can have an anti-slip effect.

The base plate 31 has a rectangular frame 310 that includes two opposite long side members 314, two short side members 315 respectively connected between the two opposite long side members 314, and a base opening 311 cooperatively defined by the long and short side members 314, 315. In this embodiment, the base opening 311 has a rectangular shape as viewed from above, but is not limited as such. Alternatively, the shape of the base opening 311 may be triangular, pentagonal, hexagonal, or any other geometric shape.

The cover unit 32 is connected to and cooperates with the base plate 31 to define an accommodating space 34 for accommodating the first or second storage device 1, 2. The cover unit 32 includes two fit over portions 321 respectively disposed on the short side members 315 and defining therebetween an opening 322 that communicates with the accommodating space 34. The opening 322 is provided for entry of the first or second storage device 1, 2 into the accommodating space 34. The fit over portions 321 are configured to fit over the first or second storage device 1, 2. Each of the fit over portions 321 has a retaining wall 323 spaced apart from the base plate 31. An access hole 324 is formed in one of the fit over portions 321 that aligns with the connecting port 13, 23 of the first or second storage devices 1, 2 when the first or second storage device 1, 2 is inserted into the accommodating space 34. As such, a good electrical connection can be formed between the connecting port 13, 23 and an external connector (not shown) via the access hole 324. Further, four corners of the first or second storage device 1, 2 are covered by the fit over portions 321 during assembly. Although in this embodiment, the fit over portions 321 are configured to fit over the four corners of the first or second storage device 1, 2, the two fit over portions 321 may be disposed at two opposite corners of the base plate 31 in an alternative embodiment, so that the fit over portions 321 may fit over only two opposite corners of the first or second storage device 1, 2. Moreover, the fit over portions 321 may also be disposed at one of the long side members 314 and one of the short side members 315, so that the fit over portions 321 may abut respectively against the corresponding long side 11, 21 and the corresponding short side 12, 22 of the first or second storage device 1, 2. A further alternative is that the cover unit 32 and the base plate 31 may form a box shape structure with the opening 322.

The two pad members 33 are connected foldably to the base plate 31 and are operable to move between an unfolded position (see FIG. 1) and a folded position (see FIG. 2). The pad members 33 are respectively disposed at two opposite locations of the base plate 31. In this embodiment, the pad members 33 are connected respectively to inner edges of the long side members 314. Each of the pad members 33 includes a pad body 331, and two hinge portions 332 connected between the pad body 331 and the inner edge of the corresponding long side member 314. Each of the hinge portions 332 has a thickness smaller than that of the pad body 331. More specifically, referring to FIG. 3, in combination with FIG. 1, each of the hinge portions 332 includes two connecting ends 333 respectively connected to the pad body 331 of one of the pad members 33 and the corresponding long side member 314, and an intermediate section 334 interconnecting the connecting ends 333. Each of the connecting ends 333 has a thickness slightly larger than that of the intermediate section 334. In this embodiment, a junction of each connecting end 333 and a respective one of the pad body 331 and the long side member 314 is curved. As such, the two pad bodies 331 can be moved between the unfolded and folded positions relative to the base plate 31 for many times without causing material fatigue and fracture so that separation of the pad members 33 from the base plate 31 can be prevented. Alternatively, the junction of each connecting end 333 and the respective one of the pad body 331 and the long side member 314 may be straight. In this case, the thickness of each connecting end 333 is the same as that of the intermediate section 334. In this embodiment, the intermediate section 334 of each hinge portion 332 is formed with a slit 335 that is located between the pad body 331 and the inner edge of the corresponding long side member 314. Preferably, the slit 355 is formed in the center of the intermediate section 334 so that each hinge portion 332 can be easily rotated or folded. The shape of each hinge portion 332 maybe elongated, oblong, square, etc. In an alternative embodiment, each hinge portion 332 may be a hinge structure.

Figure 4:
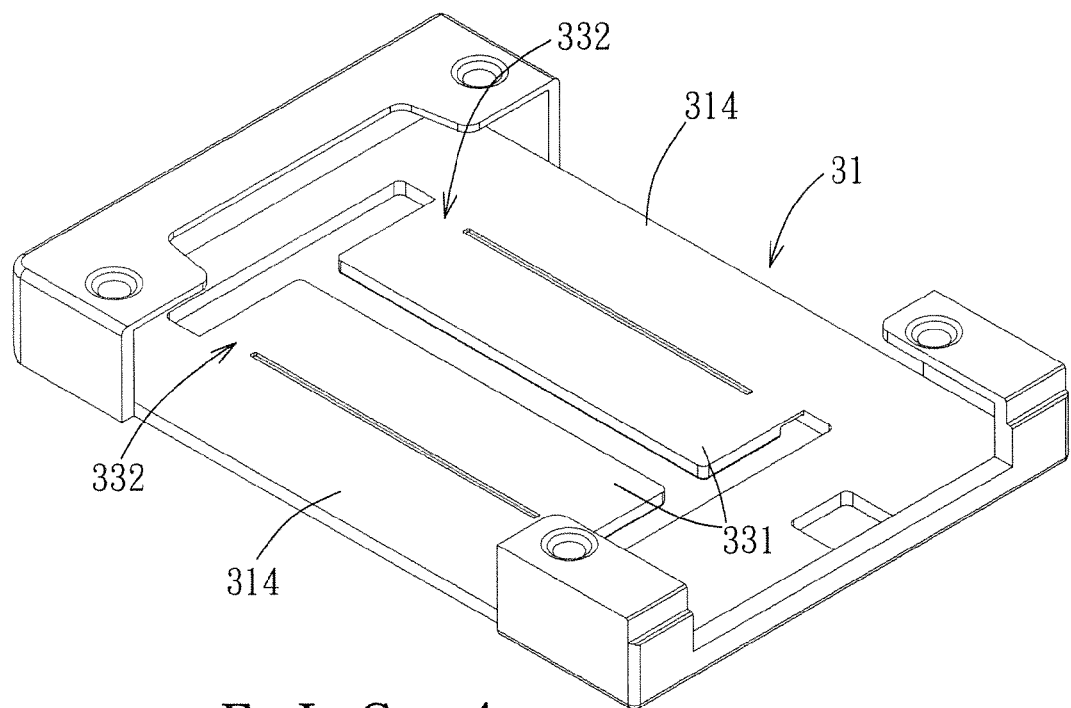
FIG. 4 is an alternative form of the protective cover of the first preferred embodiment.

With reference to FIG. 1, in this embodiment, the pad body 331 of each pad member 33 is rectangular as viewed from above, but it not limited as such. The pad body 331 may be trapezoidal, oblong or any other shape. Further, the number of the hinge portions 332 may be adjusted according to actual requirement. For example, as shown in FIG. 4, each pad member 33 has only one hinge portion 332 interconnecting the pad body 331 of one of the pad members 33 and the inner edge of the respective long side member 314. The length of the hinge portion 332 is not necessarily equal to that of the pad body 331, and may be adjusted according to actual requirement. The size of the hinge portion 332 shown in FIG. 1 is also acceptable.

Figure 5:
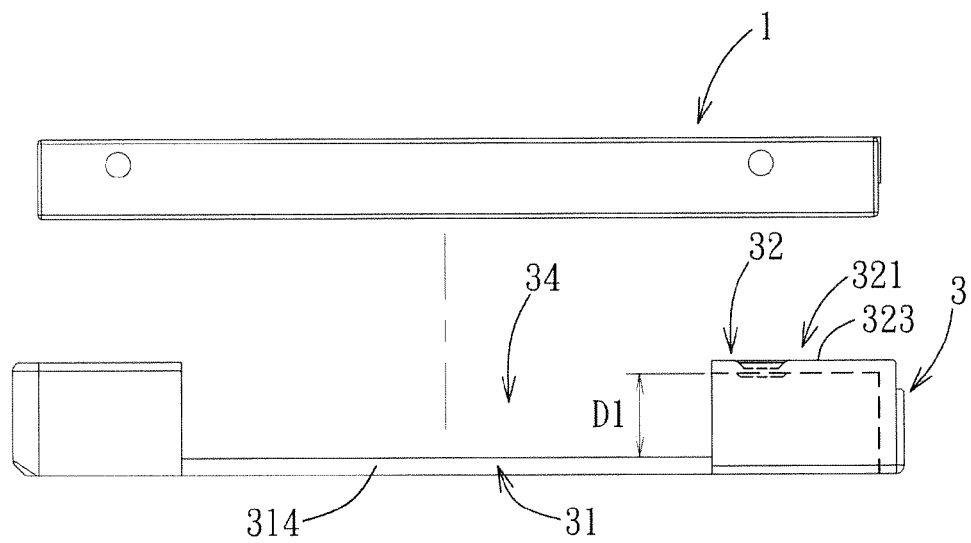
FIG. 5 illustrates how the first storage device is assembled to the protective cover of the first preferred embodiment.
Figure 6:
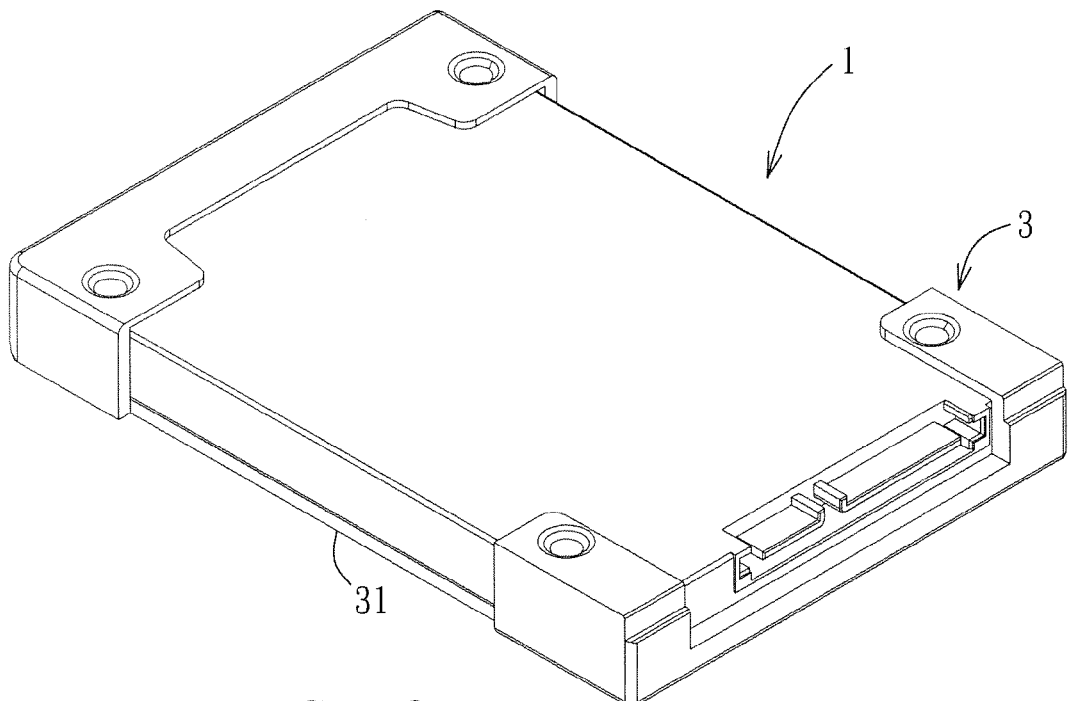
FIG. 6 is an assembled perspective view of the first storage device and the protective cover.

Referring to FIGS. 5 and 6, in combination with FIG. 1, when the two pad members 33 are in the unfolded position, they are spaced apart from inner surfaces of the long side members 314. That is, the pad body 331 of each pad member 33 and the corresponding long side member 314 form therebetween an included angle that is greater than or equal to 180 degrees. The pad body 331 may even abut against an outer surface of the corresponding long side member 314. Preferably, the pad bodies 331 of the pad members 33 and the long side members 314 are disposed horizontally in the same plane when in the unfolded position. Further, the base plate 31, the two fit over portions 321 and the two pad members 33 cooperate to define the accommodating space 34. An inner surface of the retaining wall 323 of each fit over portion 321 and the inner surface of the corresponding long side member 314 has a first distance (D1) when the pad members 33 are disposed in the unfolded position. The accommodating space 34 can accommodate the first storage device 1 at this time.

Figure 7:
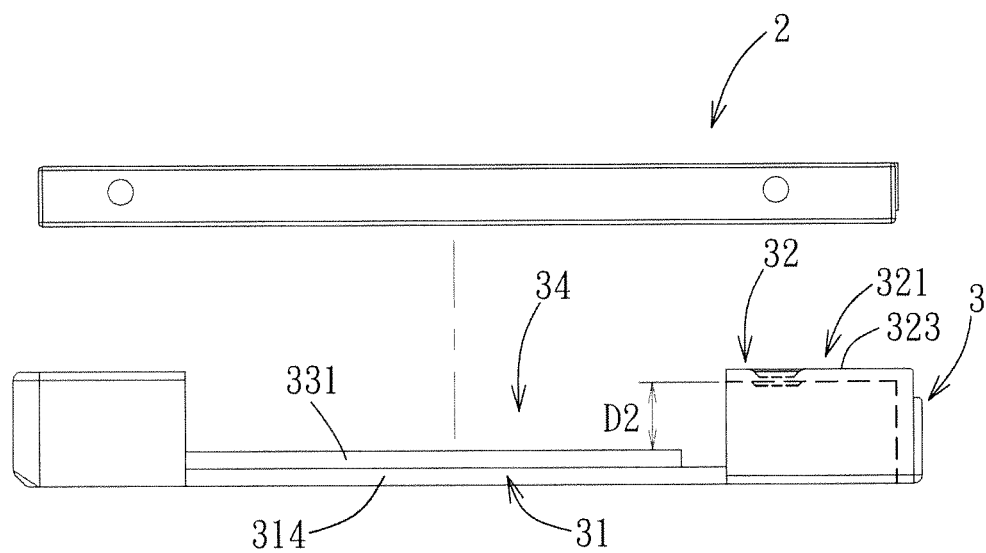
FIG. 7 illustrates how the second storage device is assembled to the protective cover of the first preferred embodiment.
Figure 8:
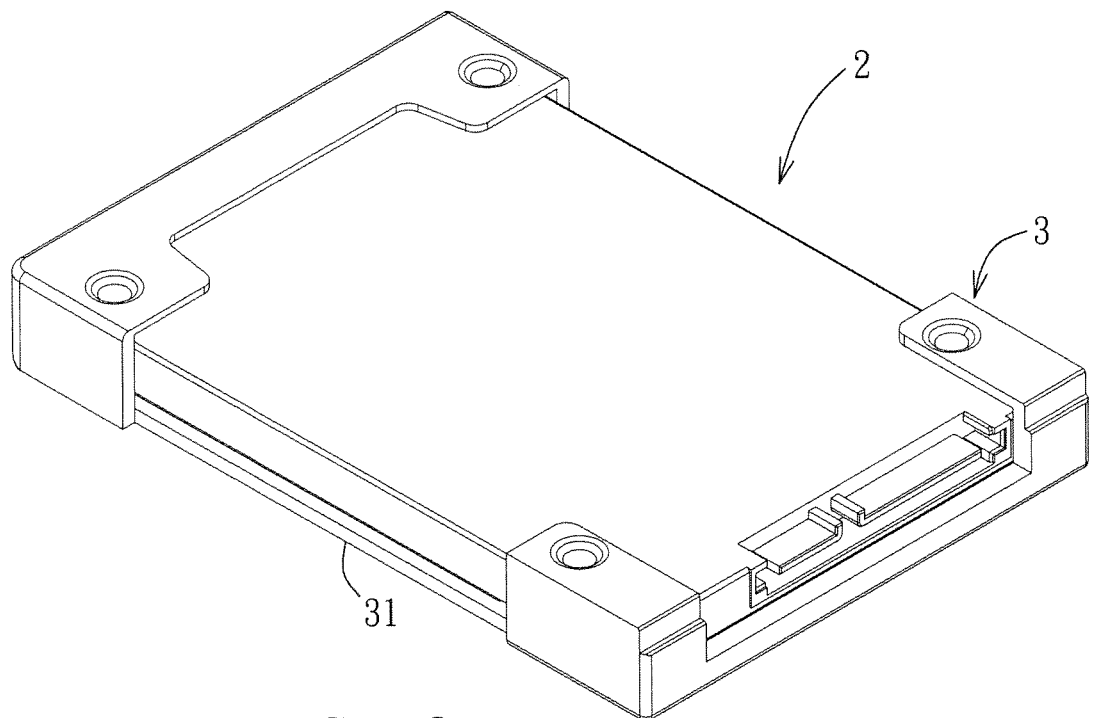
FIG. 8 is an assembled perspective view of the second storage device and the protective cover of the first preferred embodiment.

Referring to FIGS. 7 and 8, in combination with FIGS. 1 and 2, when it is desired to assemble the second storage device 2 to the protective cover 3, the pad body 331 of each pad member 33 is folded over the inner surface of the respective long side members 314 in the direction of an arrow (I) (see FIG. 1) within the accommodating space 34 so as to be disposed in the folded position. The inner surface of the retaining wall 323 of each fit over portion 321 and the pad body 331 of the corresponding pad member 33 has a second distance (D2), which is smaller than the first distance (D1). The accommodating space 34 can accommodate the second storage device 2 at this time. To shift the pad body 331 of each pad member 33 from the folded position to the unfolded position, the pad body 331 of each pad member 33 is moved in the direction of an arrow (II) (see FIG. 2). Therefore, a user can selectively assemble the first storage device 1 or the second storage device 1, 2 to the protective cover 3 according to his/her requirement by moving the pad bodies 331 of the pad members 33 between the unfolded position and the folded position.

Moreover, since the two pad members 33 are symmetrically connected to the long side members 314, when the pad bodies 331 of the pad members 33 are in the folded position, the pad bodies 331 are superimposed on the inner surfaces of the respective long side members 314 at a uniform height, so that the second storage device 2 can be stably accommodated in the accommodating space 34. A shockproof effect can be further enhanced.

Thus, by moving the pad bodies 331 of the pad members between the unfolded position and the folded position, the size of the accommodating space 34 in the protective cover 3 can be adjusted to facilitate accommodation of the first or second storage device 1, 2 therein. In comparison with the existing protective cover, the protective cover 3 of the present invention does not require two molds for making two different specifications with two material numbers, so that the costs of making molds and the storage space can be reduced, thereby simplifying the storage management.

Additionally, during assembly, a worker in a production line does not have to recheck the material number of the protective cover 3, so that the first or second storage device 1, 2 can be easily assembled to the protective cover 3. Hence, the efficiency of assembly can be enhanced. Later on, when a user intends to replace the first storage device 1 with the second storage device 2, or vice versa, he/she only needs to fold or unfold the pad bodies 331 of the pad members 33. There is no need to buy another protective cover. Hence, convenience of use is facilitated.

Referring to FIG. 9, the second preferred embodiment of the protective cover 3 according to this invention is shown to be generally identical to the first preferred embodiment. However, in this embodiment, the two pad members 33 are respectively and symmetrically connected to inner edges of the two short side members 315 of the base plate 31. Because the assembly of the first storage device 1 (see FIG. 1) or the second storage device 2 (see FIG. 2) and the protective cover 3 is similar to that described in the first preferred embodiment, a detailed description thereof is dispensed herewith for the sake of brevity.

Referring to FIG. 10, the third preferred embodiment of the protective cover 3 according to this invention is shown to be generally identical to the first preferred embodiment. However, in this embodiment, the protective cover 3 further includes a third pad member 33 connected to the inner edge of one of the short side members 315. The assembly of the first storage device 1 (see FIG. 1) or the second storage device 2 (see FIG. 2) and the protective cover 3 is similar to that described in the first preferred embodiment, so that a detailed description of the same is dispensed herewith for the sake of brevity.

Referring to FIG. 11, the fourth preferred embodiment of the protective cover 3 according to this invention is shown to be generally identical to the third preferred embodiment. However, in this embodiment, the protective cover 3 further includes a fourth pad member 33 connected to the inner edge of the other one of the short side members 315 of the base plate 31.

Referring to FIGS. 12 and 13, the fifth preferred embodiment of the protective cover 3 according to this invention is shown to be generally identical to the first preferred embodiment. However, in this embodiment, the frame 310 of the base plate 31 further includes two extending portions 317 extending into the base opening 311. The extending portions 311 are located at two opposite corners of the base opening 311. The pad members 33 are respectively connected to the extending portions 317. When each pad member 33 is in the folded position, each pad body 331 is superimposed on a respective one of the extending portions 317. In this embodiment, the pad body 331 of each pad member 33 is substantially triangular as viewed from above, but is not limited as such. Because the assembly of the first storage device 1 (see FIG. 1) or the second storage device 2 (see FIG. 2) and the protective cover 3 is similar to that described in the first preferred embodiment, a detailed description thereof is dispensed herewith for the sake of brevity.

Referring to FIG. 14, the sixth preferred embodiment of the protective cover 3 according to this invention is shown to be similar to the fifth preferred embodiment. However, in this embodiment, the frame 310 of the base plate 31 further includes another two extending portions 317' extending into the base opening 311 and respectively located at the other two opposite corners of the base opening 311. The protective cover 3 further includes another two pad members 33 connected respectively to the extending portions 317'. In other words, the base plate 31 includes four extending portions 317, 317' respectively located at the four corners of the base opening 311, and the protective cover 3 includes four pad members 33 respectively connected to the four extending portions 317, 317'.

Figure 15:
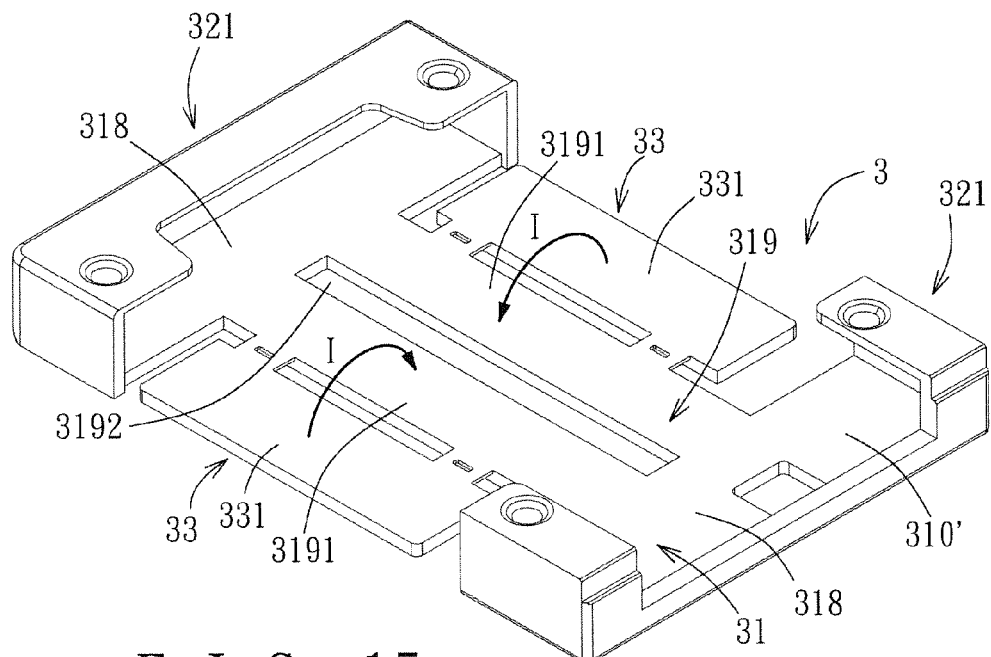
FIG. 15 is a perspective view of a protective cover according to the seventh preferred embodiment of the present invention.
Figure 16:
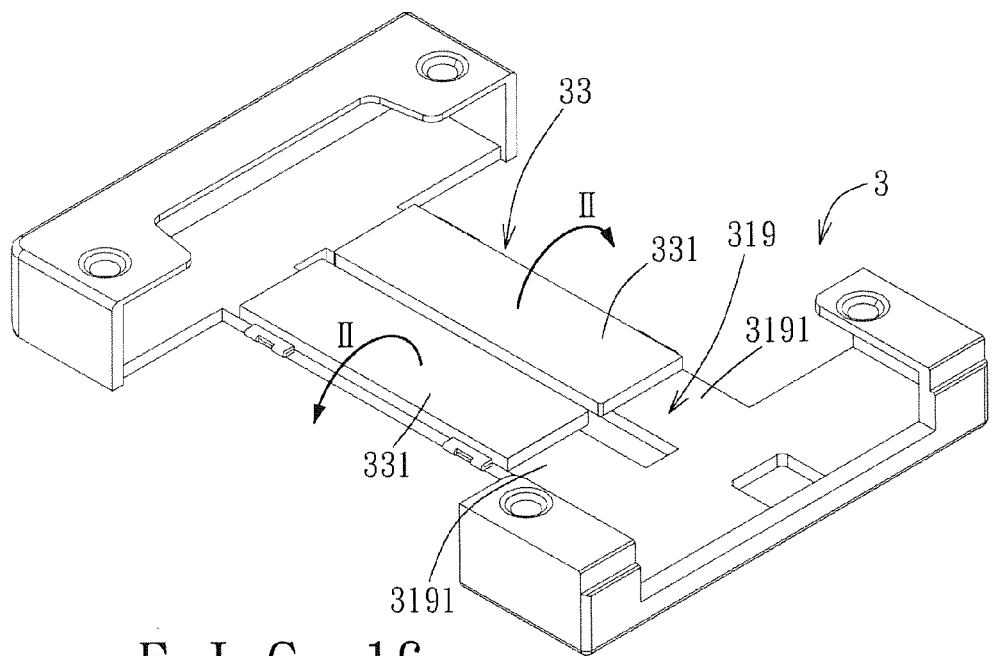
FIG. 16 is a view similar to FIG. 15, but illustrating two pad members in a folded position.

Referring to FIGS. 15 and 16, the seventh preferred embodiment of the protective cover 3 according to this invention is shown to be generally identical to the first preferred embodiment. However, in this embodiment, the base plate 31 has an I-shaped frame 310' that includes two opposite short side members 318 and a long intermediate member 319 connected between the short side members 318. The intermediate member 319 has an elongated slot 3192 that divides the intermediate member 319 into two parts 3191. The pad members 33 are connected respectively and foldably to outer edges of the two parts 3191 of the intermediate member 319. In an alternative embodiment, the slot 3192 maybe omitted.

Further, in this embodiment, to shift the pad bodies 331 of the pad members 33 from the unfolded position (see FIG. 15) to the folded position (see FIG. 16), the pad bodies 331 are respectively moved in the direction of arrows (I) so as to fold over the respective parts 3191 of the intermediate member 319 and be disposed in the folded position. When the pad bodies 331 are respectively moved in the direction of arrows (II), the pad bodies 331 are shifted from the folded position to the unfolded position.

Referring to FIG. 17, the eighth preferred embodiment of the protective cover 3 according to this invention is shown to be similar to the seventh preferred embodiment. However, in this embodiment, the protective cover 3 only includes one pad member 33 that is connected foldably to the outer edge of one of the parts 3191 of the intermediate member 319.

In sum, by flipping or rotating the pad bodies 331 of the pad members 33 between the unfolded position and the folded position, the accommodating space 34 of the protective cover 3 of this invention can be adjusted so as to accommodate either the first storage device 1 or the second storage device 2 which has a thickness different from that of the first storage device 1. As such, a worker in a production line or a user can adjust the pad bodies 331 so as to assemble the first storage device 1 or the second storage device 2 to the protective cover 3. The assembly efficiency can thus be enhanced. Therefore, the objects of the present invention can be realized.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A protective cover comprising:
   a base plate;
   a cover unit connected to and cooperating with said base plate to define an accommodating space for accommodating a first storage device or a second storage device which has a thickness smaller than that of the first storage device, said cover unit including an opening communicating with said accommodating space for entry of the first or second storage device into said accommodating space, and at least one fit over portion disposed on said base plate and adapted to fit over the first or second storage device, said fit over portion having a retaining wall spaced apart from said base plate; and
   at least one pad member that is connected foldably to said base plate and that is operable to move between an unfolded position and a folded position, said pad member being folded over said base plate within said accommodating space when in said folded position;
   wherein said retaining wall and said base plate has a first distance when said pad member is in said unfolded position, and said retaining wall and said pad member has a second distance when said pad member is in said folded position, said second distance being smaller than said first distance;
   wherein said accommodating space is adapted to accommodate the first storage device when said pad member is disposed in said unfolded position, and is adapted to accommodate the second storage device when said pad member is disposed in said folded position.

2. The protective cover as claimed in claim 1, wherein two said pad members are connected foldably to said base plate and are respectively disposed at two opposite locations of said base plate.

3. The protective cover as claimed in claim 2, wherein said pad member has a pad body, and a hinge portion connected between said pad body and said base plate, said hinge portion of each of said pad members having a thickness smaller than that of said pad body.

4. The protective cover as claimed in claim 3, wherein said base plate has a frame that includes a plurality of interconnected side members, said cover unit including two said fit over portions respectively disposed on two opposite ones of said side members and defining therebetween said opening that communicates with said accommodating space, said frame further including a base opening cooperatively defined by said interconnected side members of said frame.

5. The protective cover as claimed in claim 4, wherein said pad members are connected respectively to inner edges of two opposite ones of said side members.

6. The protective cover as claimed in claim 4, wherein said frame further includes two extending portions extending into said base opening and located at two opposite corners of said base opening, said pad members being respectively connected to said extending portions.

7. The protective cover as claimed in claim 4, wherein said frame includes two said side members and an intermediate member connected between said two side members, said pad members being connected respectively to outer edges of said intermediate member.

8. The protective cover as claimed in claim 3, wherein said hinge portion includes two connecting ends connected to said pad member and said base plate, and an intermediate section interconnecting said connecting ends, said hinge portion being formed with a slit at said intermediate section.

9. The protective cover as claimed in claim 1, wherein said protective cover is made of a soft material.

10. The protective cover as claimed in claim 1, wherein said pad member and said base plate are disposed horizontally in the same plane when in said unfolded position.

11. An assembly of a storage device and a protective cover comprising:
a first storage device or a second storage device which has a thickness smaller than that of said first storage device; and
a protective cover including
a base plate,
a cover unit connected to and cooperating with said base plate to define an accommodating space for accommodating said first or second storage device, said cover unit including an opening communicating with said accommodating space for entry of the first or second storage device into said accommodating space, and at least one fit over portion disposed on said base plate and configured to fit over said first or second storage device, said fit over portion having a retaining wall spaced apart from said base plate; and
at least one pad member that is connected foldably to said base plate and that is operable to move between an unfolded position and a folded position, said pad member being folded over said base plate within said accommodating space when in said folded position;
wherein said retaining wall and said base plate has a first distance when said pad member is in said unfolded position, and said retaining wall and said pad member has a second distance when said pad member is in said folded position, said second distance being smaller than said first distance;
wherein said accommodating space is configured to accommodate the first storage device when said pad member is disposed in said unfolded position, and is configured to accommodate the second storage device when said pad member is disposed in said folded position.

12. The assembly as claimed in claim 11, wherein two said pad members are connected foldably to said base plate and are respectively disposed at two opposite locations of said base plate.

13. The assembly as claimed in claim 12, wherein said pad member has a pad body, and a hinge portion connected between said pad body and said base plate, said hinge portion of each of said pad members having a thickness smaller than that of said pad body.

14. The assembly as claimed in claim 13, wherein said base plate has a frame that includes a plurality of interconnected side members, said cover unit including two said fit over portions respectively disposed on two opposite ones of said side members and defining therebetween said opening that communicates with said accommodating space, said frame further including a base opening cooperatively defined by said interconnected side members of said frame.

15. The assembly as claimed in claim 14, wherein said pad members are connected respectively to inner edges of two opposite ones of said side members.

16. The assembly as claimed in claim 14, wherein said frame further includes two extending portions extending into said base opening and located at two opposite corners of said base opening, said pad members being respectively connected to said extending portions.

17. The assembly as claimed in claim 14, wherein said frame includes two said side members and an intermediate member connected between said two side members, said pad members being connected respectively to outer edges of said intermediate member.

18. The assembly as claimed in claim 13, wherein said hinge portion includes two connecting ends connected to said pad member and said base plate, and an intermediate section interconnecting said connecting ends, said hinge portion being formed with a slit at said intermediate section.

19. The assembly as claimed in claim 11, wherein said protective cover is made of a soft material.

20. The assembly as claimed in claim 11, wherein said pad member and said base plate are disposed horizontally in the same plane when in said unfolded position.

\* \* \* \* \*